United States Patent [19]
Lawrence et al.

[11] Patent Number: 5,682,039
[45] Date of Patent: Oct. 28, 1997

[54] MEDIA POSITION SENSING SYSTEM HAVING A PLURALITY OF APERTURES IN THE MEDIA EDGE MARGIN

[75] Inventors: James Lawrence, Irvine; John M. Bertalan, Tustin, both of Calif.

[73] Assignee: CalComp Inc., Anaheim, Calif.

[21] Appl. No.: 440,604

[22] Filed: May 15, 1995

[51] Int. Cl.⁶ .................... G01N 21/86; G06K 7/10; G01D 15/24
[52] U.S. Cl. .................... 250/559.4; 250/559.44; 250/570; 346/136
[58] Field of Search ............ 250/559.04, 559.4, 250/559.44, 570; 346/54, 136

[56] References Cited

U.S. PATENT DOCUMENTS

| | | | |
|---|---|---|---|
| 3,115,289 | 12/1963 | Namenyi-Katz | 250/559.44 |
| 3,812,375 | 5/1974 | Rempala | 250/570 |
| 3,919,560 | 11/1975 | Nopper | 250/559.44 |
| 3,950,652 | 4/1976 | Yamashita | 250/570 |
| 4,683,380 | 7/1987 | Shipkowski et al. | 250/559.44 |
| 4,691,112 | 9/1987 | Wydler | 250/570 |

*Primary Examiner*—Stephone Allen
*Attorney, Agent, or Firm*—Frederic P. Smith; William F. Porter, Jr.

[57] ABSTRACT

A media position sensing system for a plotter in which a media is driven along at least one edge thereof comprising a plurality of apertures in the media positioned within the width of the edge and an optical detector positioned along the edge for sensing the appearance of the apertures in order to sense a selected position of the media. In a particular embodiment, the width of the apertures are less than one-half the width of the edge and are offset spaced from one another across the width of the edge to present an effective detection capability equivalent to a single aperture having a width equal to the width of the edge. The apertures extend along the length of the media a distance approximately equal to the width of the edge and are located near the end of the length of the media for sensing the end of the media.

11 Claims, 1 Drawing Sheet

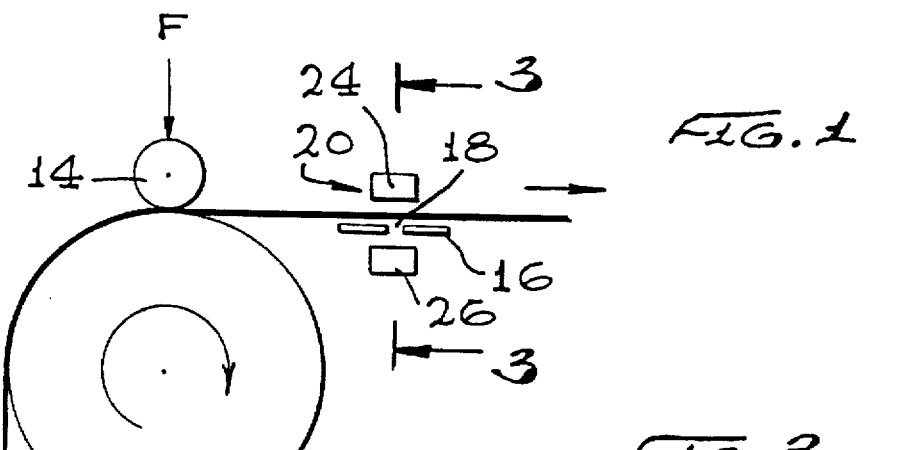
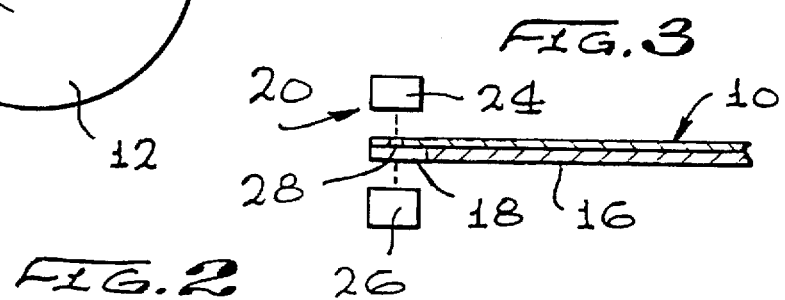
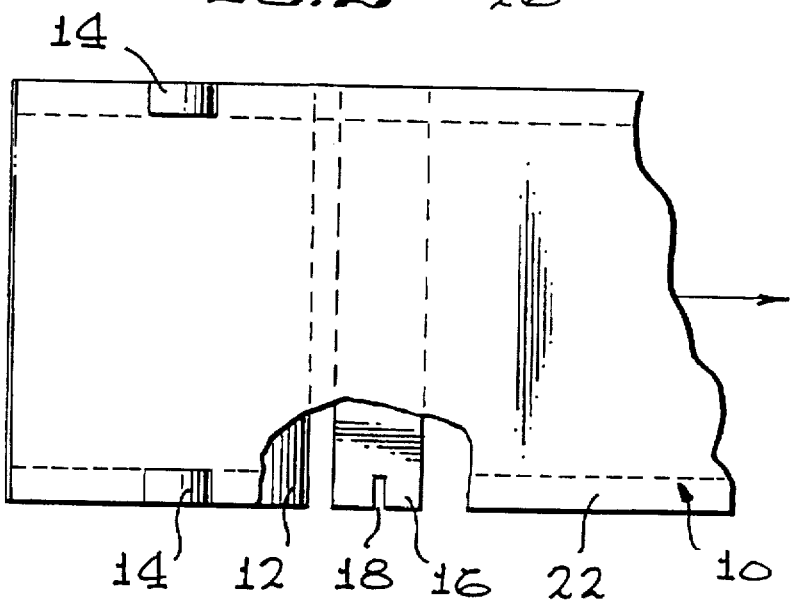
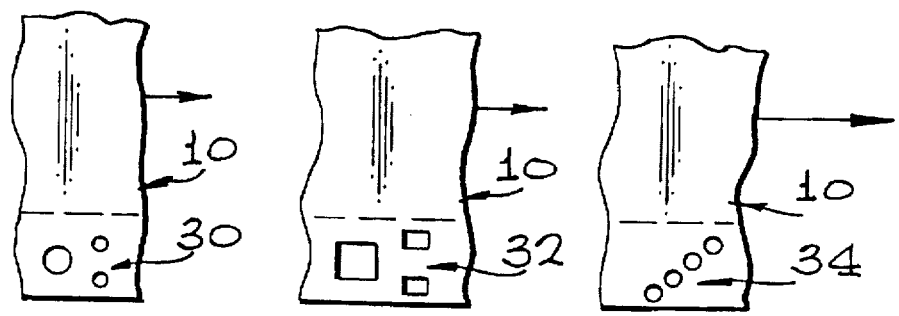

MEDIA POSITION SENSING SYSTEM HAVING A PLURALITY OF APERTURES IN THE MEDIA EDGE MARGIN

BACKGROUND OF THE INVENTION

1. Field of the Invention

This invention relates to the field of media sensing and, in particular, to an improved media position sensing system for use in plotters.

2. Description of Related Art

With the increased use of computer hardware and software to generate information in visible multidimensional form such as graphs and graphics, as contrasted to mere numerical listings, there has come a concomitant increased use of plotters to fix such information on a tangible media. Plotters capable of handling the output of such computer systems have been developed and are continually being upgraded to ensure that fast and accurate plots are being produced. With the increase in plotter speed, however, has come inevitable problems in ink or lead supply, even and accurate line placement and proper media supply. Thus, it is imperative that there exist a quick recognition of the above problems and a rapid warning or system shut down. This is particularly important in the area of media supply since a failure of media supply due to media runout can result in a total loss of information presumed to be recorded.

Numerous techniques have been employed for sensing the runout of media supply, among which have been the use of transparent or reflective portions in tapes to indicate the end of the tapes, as shown in U.S. Pat. Nos. 4,570,075 and 4,054,927. These techniques have the disadvantages that they are specialized and costly, unreliable due to sensitivity from stray light, and unsuited for plotters since the entire plotter media surface must be usable except for the non-plot area at the edge of the media in the path of the driving pinch roller. Precision black or silver marks have also been added to the media but have also been found to be costly and unreliable because of sensitivity to stray light. While the use of holes would result in less expense and holes have been employed to convey data in a punched tape, as in U.S. Pat. No. 3,915,040, these holes have always been used in a sprocket type configuration and are not subject to misalignment and tearing problems.

Thus, it is a primary object of the present invention to provide an improved media position sensing system for a plotter.

It is another object of the present invention to provide an improved media position sensing system for a plotter which can be used in the non-plot area of the media.

It is a further object of the present invention to provide an improved media position sensing system for a plotter which is reliable and low cost.

It is still another object of the present invention to provide an improved media position sensing system for a plotter which is not subject to media misalignment and tearing problems.

It is an additional other object of the present invention to provide an improved media position sensing system for a plotter which is able to accurately sense the end of the media.

SUMMARY OF THE INVENTION

A media position sensing system for a plotter is provided in which a media is driven along at least one edge thereof comprising a plurality of apertures in the media positioned within the width of the edge and an optical detector positioned along the edge for sensing the appearance of the apertures in order to sense a selected position of the media. In a particular embodiment, the width of the apertures are less than one-half the width of the edge and are offset spaced from one another across the width of the edge to present an effective detection capability equivalent to a single aperture having a width equal to the width of the edge. The apertures extend along the length of the media a distance approximately equal to the width of the edge and are located near the end of the length of the media for sensing the end of the media.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a simplified side view illustrating the present invention in its operational environment.

FIG. 2 is a top view, partially broken away, of FIG. 1.

FIG. 3 is a cross-sectional view taken along line 3—3 of FIG. 1.

FIGS. 4a–c are plan views of the media of the present invention illustrating various clusters of apertures.

DESCRIPTION OF THE PREFERRED EMBODIMENT

Referring now to FIG. 1, a media 10 is shown being driven by a drum 12 and passing between the drum 12 and a spring-loaded pinch roller 14. The media 10 then passes over a platen 16 where the media is printed or plotted on by a print head (not shown). The platen 16 has a slit 18 therein and a sensor 20 is positioned to pass a beam of light through the slit 18. The sensor 20 is generally supported in part by the support for the pinch roller 14 and in part by the platen 16 and generates a beam of light generally 0.020 inches in diameter which impinges on the media 10. As shown in FIGS. 2 and 3, the media 10 has an edge 22 which is approximately equal to the width of the pinch roller 14 and is generally 0.500 inches in width. The sensor 20 consists of a photodiode 24 and a detector 26 spaced approximately 0.250 inch apart, a so-called blocking type optical sensor, and which under the proper conditions detects the presence of an aperture 28 in the media 10 which indicates a selected position along the media 10.

Due to misalignment or mislocation of the media 10 during installation prior to plotting, it is desirable to make the aperture 28 as large as possible so that it can be detected by the sensor 20 to indicate, for example, the end of the media 10. It has been discovered, however, that if the aperture 28 is made too large, such as the width of the edge 22, the aperture 28 can cause the media 10 to mistrack and jam in the plotter as the aperture 28 in the media 10 passes under the pinch roller 14. On the other hand, a single aperture 28 less than 0.250 inches in diameter often goes undetected. As is shown in FIG. 4a, a cluster 30 of circular apertures 28 is provided in the edge 22 offset spaced from one another across the width of the edge 22. The effect of such a cluster 30 is equivalent to having an aperture the width of the edge 22 in the path of the pinch roller 14 for detection by the sensor 20, while not having the shortcomings of an aperture of such width. In FIG. 4b, a cluster of rectangular apertures 28 is shown, while in FIG. 4c, a linear cluster of apertures 28 is illustrated. For an edge 22 width of 0.500 inches, media 10 can be successfully driven with aperture 28 diameters of less than 0.250 inches, that is, less than one-half the width of the edge 22, or square, rectangular or polygonal aperture 28 widths of less than 0.188 inches located within the edge 22, while the apertures 28 can be made as small as 0.090 inches in diameter depending on the thickness and stiffness of the media 10. In addition, while the apertures 28 can extend for an indeterminate distance along the length of the media 10, the apertures 28 generally extend about the width of the edge 22, that is about 0.500 inches.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

We claim:

1. A media position sensing system for a plotter in which a media is driven along at least one edge thereof comprising:
    a plurality of apertures in said media positioned within the width of said edge for use in detecting a selected position of said media; and
    optical detector means positioned along said edge for sensing the appearance of said apertures, whereby a selected position of said media is sensed.

2. The sensing system of claim 1 wherein the width of said apertures are less than one-half said width of said edge.

3. The sensing system of claim 1 wherein said apertures are offset spaced from one another across said width of said edge.

4. The sensing system of claim 3 wherein said apertures present to said detector means a detection capability equivalent to a single aperture having a width equal to said width of said edge.

5. The sensing system of claim 1 wherein said apertures extend along the length of said media within a distance approximately equal to the width of said edge.

6. The sensing system of claim 1 wherein said apertures are circular in shape.

7. The sensing system of claim 1 wherein said apertures are polygonal in shape.

8. The sensing system of claim 1 wherein said width of said edge is substantially the width of a pinch roller used to drive said media along said edge.

9. The sensing system of claim 8 wherein said media is supported by a drum and said pinch roller and said drum contain said media therebetween to drive said media.

10. The sensing system of claim 1 wherein said apertures are located near the end of the length of said media, whereby said end of said media is sensed.

11. A media position sensing system for a plotter in which a media is driven along at least one edge thereof comprising:
    a plurality of apertures in said media positioned within the width of said edge for use in detecting a selected position of said media; and
    optical detector means positioned along said edge for sensing the appearance of said apertures, whereby a selected position of said media is sensed, said plurality of apertures presenting to said detector means a detection capability equivalent to a single aperture having a width equal to said width of said edge.

* * * * *